May 7, 1957
H. B. BARRETT
2,791,032
BRAKE DRUM GAUGE
Filed April 23, 1954
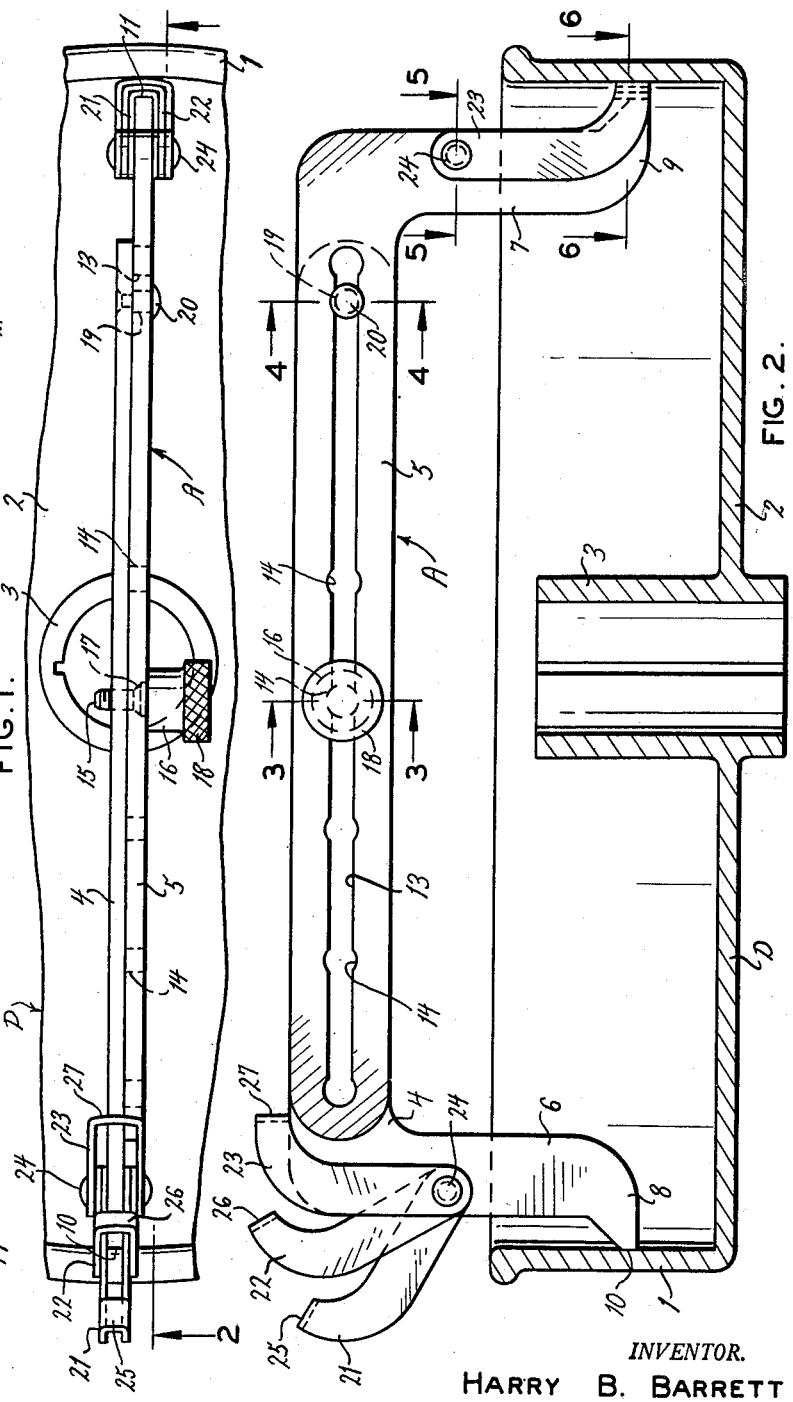
INVENTOR.
HARRY B. BARRETT
BY
ATTORNEY

… … …

United States Patent Office 2,791,032
Patented May 7, 1957

2,791,032

BRAKE DRUM GAUGE

Harry B. Barrett, Clayton, Mo.

Application April 23, 1954, Serial No. 425,252

3 Claims. (Cl. 33—143)

This invention relates in general to certain new and useful improvements in brake drum gauges.

In testing and maintaining automotive brakes, it is necessary to determine the internal diametral size of the brake drum accurately and quickly, and to ascertain whether the drum is so far oversize or out of round that it cannot be satisfactorily turned. If, on the other hand, the brake drum can still be machined, it is also desirable to determine how much turning must be done.

It is, therefore, one of the primary objects of the present invention to provide a gauge which is adapted for quick, accurate and convenient measurement of the inside diameter of an automotive brake drum or similar device.

It is another object of the present invention to provide a brake drum gauge which is simple in construction and can be produced accurately but at relatively low cost.

It is an additional object of the present invention to provide a gauge which can be quickly adjusted to fit within and measure brake drums of various different diameters and size ranges.

It is also an object of the present invention to provide a brake drum gauge which is so constructed as to clear the wheel hub and other outwardly projecting elements forming a part of the wheel structure.

With the above and other objects in view, my invention resides in the novel features of form, construction, arrangement, and combination of parts presently described and pointed out in the claims.

In the accompanying drawings (one sheet)—

Figure 1 is a top plan view of a brake drum gauge constructed in accordance with and embodying the present invention, and illustrating the manner in which such gauge is actually used in a brake drum;

Figure 2 is a longitudinal sectional view taken along lines 2—2 of Figure 1; and Figures 3, 4, 5, and 6 are fragmentary transverse sectional views taken along lines 3—3, 4—4, 5—5, and 6—6, respectively, of Figure 2.

Referring now in more detail and by reference characters to the drawings, a preferred embodiment of the present invention, A designates a brake drum gauge constructed in accordance with and embodying the present invention and adapted for use in measuring brake drums, such as, for example, the brake drum D which integrally includes an annular rim 1 and a circular end wall 2 centrally provided with a tubular hub 3 which projects for a substantial distance on both sides thereof, as best seen in Figure 2.

The brake drum gauge A comprises a pair of complementary shaped bars 4, 5, stamped or otherwise formed from a suitable material such as heavy steel plate, and respectively provided at their outer ends with relatively short parallel legs 6, 7, each terminating in laterally enlarged or projecting end-portion 8, 9, respectively, the later being, furthermore, provided with outwardly presented contact faces 10, 11, for engagement with the inner surface of the brake drum D as shown in Figure 2.

The bars 4, 5, are arranged in flatwise slidable disposition upon each other and the bar 4 is centrally provided with a threaded aperture 12, and the bar 5 is correspondingly provided with an elongated slot 13 which is in registration with the aperture 12. The slot 13 is, furthermore, provided at spaced intervals with diametrally-enlarged conical seats 14 which have their centers coincident with the center line of the slot 13 and in effect straddle it, as shown in Figure 2.

Provided for threaded disposition in the aperture 12 is a stud 15 having an outside diametral size slightly smaller than the width of the slot 13 and being provided at its outer end with a diametrally enlarged head 16 which is provided with a tapered face 17 for self-aligning disposition within any one of the seats 14. The head 16 is in turn integrally provided at its outer end with a diametrally enlarged knurled knob 18 to facilitate manipulation thereof. Adjacent its end the bar 4 is also provided with a shouldered rivet 19 adapted for snug fitting slidable disposition within the slot 13 and having an enlarged round head 20 for holding the bars 4, 5, in flatwise overlying parallel relation.

The threaded aperture 12, the conical seats 14 and stud 15 are accurately machined so that the bars 4, 5, may be shifted outwardly with respect to each other to fit brake drums of various diametral sizes. For example, when the stud 15 is in the position shown in Figure 2, the distance between the contact faces 10, 11, will be precisely 9.00 inches. Inasmuch as the distance between the center lines of adjacent seats 14 is exactly 1.00 inch it is possible, by adjusting the bars 4, 5, outwardly to vary the distance between the contact faces 10, 11, from 8.00 inches to 12.00 inches. By this means the brake drum gauge A can be very quickly and conveniently set to accommodate any size of brake drum between 8 and 12 inches in diameter, which range embraces all conventional passenger car sizes now in use in this country.

The legs 6, 7, are each pivotally provided with overlying nested set of three U-shaped gauging elements 21, 22, 23, all swung upon a common pivot pin 24 and respectively including flat shim-portions 25, 26, 27 each having a thickness of 0.010 inch and being adapted to overlie each other in facewise abutting engagement as shown in Figure 6. Thus when the gauging elements 21, 22, 23 of the leg 7 are swung down and the gauging elements 21, 22, 23 of the leg 6 are swung up as shown in Figure 2, the particular brake drum D will have a diametral size of 9.030 inches. If only one gauging element 21 is down the measurement would be 9.010 inches. Similarly, if all the gauging elements 21, 22, 23 of both legs 6, 7, are down, the measurement is 9.060 inches.

By setting the brake drum gauge A to the particular diametral size of the drum being inspected, for example, 9.00 inches, it is possible to slip the gauge A into the drum D. All brake drums which have been in use are slightly oversize and, therefore, the gauge A will fit diametrally across the drum D with a very slight amount of end play. If the drum D is almost unworn and is, therefore, only a few thousandths oversize the gauge A will just barely fit with all gauging elements 21, 22, 23 swung up into inoperative position.

If the brake drum D is appreciably worn, the gauge A will fit rather loosely and the mechanic, by swinging down one or more of the gauging elements, can quickly determine the amount by which the brake drum is oversized. Since automotive manufacturers and brake designers recommend sixty thousandths as the maximum limit of oversize permissible in an operative brake, it will, of course, be evident that the particular drum being examined, that is to say, one which is thirty thousandths oversize, may be safely turned down as a part of the brake repairing operation. If, on the other hand, the brake drum is more than sixty thousandths oversize, it cannot safely be turned and must be replaced.

The brake drum gauge A, by reason of its shape, fits conveniently over and around the projecting portions of the hub 3 and will provide adequate clearance with respect thereto. This arrangement is, furthermore, particularly useful when the brake drum gauge is rotated within the drum D to measure various different diameters, so that the mechanic may determine very speedily whether or not the drum D has worn eccentrically and is, therefore, out-of-rounds. In many instances, a brake drum, which, on inspection, appears to be quite smooth and relatively unworn and may appear, across one diameter, to be well within the size limits or tolerance, may be out-of-round due to various accidental causes. It is, therefore, desirable to determine whether or not the drum, which otherwise appears to be in good condition, is out-of-rounds. The brake drum gauge A is uniquely well suited to determine this latter condition speedily and accurately.

It should be understood that changes and modifications in the form, construction, arrangement, and combination of the several parts of the brake drum gauge may be made and substituted for those herein above shown and described without departing from the nature and principle of my invention.

Having thus described my invention, what I claim and desire to secure by Letters Patent is:

1. A brake drum gauge comprising a pair of similarly shaped flat bars disposed in facewise overlapping slidable engagement with each other and being integrally provided at their outer ends with laterally projecting arms having outwardly projecting end-portions which are, in turn, provided with outwardly presented contact faces for abutting engagement with the brake drum being measured, releasable means for securing the members adjustably together, and a size-differentiating U-shaped shim having the upper end of its legs lying on opposite sides of and being pivotally mounted on one of said laterally projecting arms, said U-shaped shim having a flattened bight adapted for optional disposition over the contact face of said one arm for increasing the gauging dimension thereof by a fixed increment.

2. A brake drum gauge comprising a pair of similarly shaped flat bars disposed in facewise overlapping slidable engagement with each other and being integrally provided at their outer ends with laterally projecting arms having outwardly projecting end-portions which are, in turn, provided with outwardly presented flat contact faces for abutting engagement with the brake drum being measured, one of said bars being longitudinally slotted and provided at measured intervals with counterbores which straddle the slot in the form of equal and symmetrical circular arcs, a pin rigidly mounted in the overlapped end of the other bar and being snugly but slidably fitted in the slot, a locking screw threadedly mounted in the last named bar in spaced relation to the pin and having a diametrally enlarged shank-portion for snug-fitting optional engagement with any one of the counterbores whereby to secure the bars adjustably together, and a size-differentiating U-shaped shim having the upper end of its legs lying on opposite sides of and being pivotally mounted on one of said laterally projecting arms, said U-shaped shim having a flattened bight adapted for optional disposition over the contact face of said one arm for increasing the gauging dimension thereof by a fixed increment.

3. A brake drum gauge comprising a pair of similarly shaped flat bars disposed in facewise overlapping slidable engagement with each other and being integrally provided at their outer ends with laterally projecting arms having outwardly projecting end-portions which are, in turn, provided with outwardly presented flat contact faces for abutting engagement with the brake drum being measured, one of said bars being longitudinally slotted and provided at measured intervals with counterbores which straddle the slot in the form of equal and symmetrical circular arcs, a pin rigidly mounted in the overlapped end of the other bar and being snugly but slidably fitted in the slot, a locking screw threadedly mounted in the last named bar in spaced relation to the pin and having a diametrally enlarged shank-portion for snug-fitting optional engagement with any one of the counterbores whereby to secure the bars adjustably together, and a plurality of U-shaped size-differentiating shims each consisting of a pair of spaced parallel legs connected by a laterally offset flat bight, said shims being in respectively larger sizes so as to fit over each other in nested relationship, the upper ends of the legs of said shims being disposed embracingly around one laterally projecting arm and being swingably secured thereto on a common pivot for optional disposition over the contact face thereof whereby to increase the gauging dimension thereof by fixed increments.

References Cited in the file of this patent

UNITED STATES PATENTS

| | | |
|---|---|---|
| 653,309 | McHenry | July 10, 1900 |
| 847,720 | Barbo | Mar. 19, 1907 |
| 1,205,687 | Verhey et al. | Nov. 21, 1916 |
| 2,268,354 | Thomason | Dec. 30, 1941 |
| 2,769,241 | Barrett | Nov. 6, 1956 |